United States Patent Office 2,697,712
Patented Dec. 21, 1954

2,697,712

DI(2-BENZIMIDAZOLYL) METHANES AND PROCESS OF PRODUCING COLORING MATTERS THEREFROM

Robert G. Arnold, Salem, N. J., assignor to E. I. du Pont de Nemours and Company, Wilmington, Del., a corporation of Delaware No Drawing. Application April 3, 1952,
Serial No. 280,399

8 Claims. (Cl. 260—309.2)

This application is a continuation-in-part of my application Serial No. 278,971, filed March 27, 1952, and relates to novel organic compounds useful for the production of coloring matters.

According to this invention novel coloring matters are produced by synthesizing organic compounds which possess a characteristic structure as expressed by the following formula

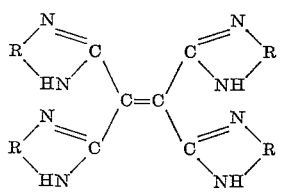

wherein the R's represent monocyclic aromatic radicals to which the respective N-atoms are attached in ortho positions. The novel coloring compounds may be designated generically as tetrabenzimidazolyl ethylenes, wherein the benzo rings may be variously substituted by alkyl, alkoxy, halogen, nitro, amino and sulfo groups. According to the nature of such substituents, the novel coloring matters may be water-soluble and usable as dyestuffs, or they may be water-insoluble and useful as pigments.

Further details on the nature and structure of my novel chemical compounds will appear from their modes of synthesis which follow. Several modes of synthesis are available, and some of them produce first isolable intermediate compounds, which are also novel and accordingly, constitute part of this invention.

According to one mode of synthesis, novel and useful intermediate compounds are first produced by reacting 1,1,2,2-tetracarbomethoxy ethane with a phenyl compound having two primary amino groups in ortho position to each other. The products thus obtained are convertible into coloring matters of high tinctorial value upon being treated with oxidizing agents. This mode of operation is described more in detail and claimed in my said copending application, Serial No. 278,971.

But the instant application is concerned particularly with another mode of synthesis, according to which the novel coloring matters are produced from intermediates which may be designated generically as dibenzimidazolylmethanes. These in turn are producible by reacting the selected orthophenylene diamine with a lower dialkyl malonate, for instance diethyl or dimethyl malonate. Reaction is effected by heating the two in an inert organic solvent, for instance trichlorobenzene, at a temperature of about 160° to 210° C., until alcohol and water are no longer split off. The reaction may be illustrated by the following typical equation:

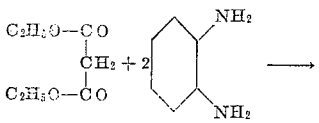
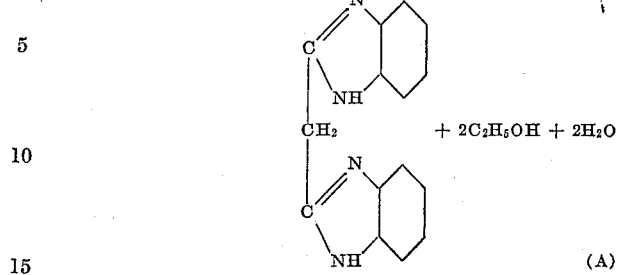

The intermediates thus obtained (typified by compound A in the above equation) are by themselves colorless compounds. They are insoluble in water, essentially insoluble to sparingly soluble in organic solvents, but fairly well soluble in dilute aqueous acids.

Their conversion into color is effected by subjecting the compounds to the action of an oxidizing agent, which effects dimerization thereof in the following manner:

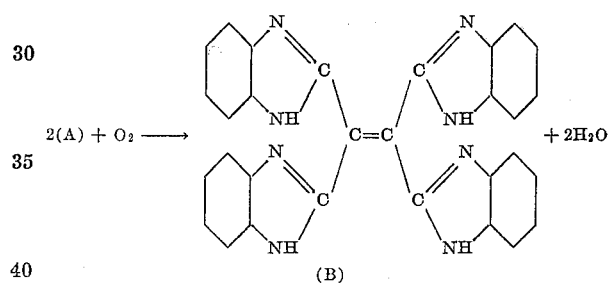

This step may be carried out in a manner similar to the oxidation step described in my earlier application for the first mode of synthesis above mentioned, that is, by treating the intermediate methane compound with nitrobenzene in the presence of an alkali-metal carbonate, or with concentrated nitric acid, or with aqueous hypochlorous acid (produced in situ, for instance, from sodium hypochlorite and acetic acid), or with a glacial acetic acid solution of selenium dioxide, or by heating the intermediate in an organic liquid medium with powdered sulfur, or by exposing it to air oxidation at an elevated temperature, say about 200° C., in powder form or while suspended in a high-boiling, inert solvent.

The oxidation may also be effected in situ, by reacting the dialkyl malonate and o-phenylene diamine in an inert solvent consisting of or containing nitrobenzene and an alkali-metal carbonate.

As in the case of the ethane intermediate, oxidation may be attended by introduction of substituents into the benzo rings. For instance, the use of hypochlorous acid results in a compound containing from 0.5 to 1 atom of Cl per molecule.

The resulting coloring matter in all the cases heretofore mentioned is water-insoluble, and is therefore useful as a pigment.

However, the dimerized compound may also be treated with sulfonating agents, for instance oleum, in which event the compound becomes sulfonated and acquires water-solubility. The resulting compound in this case may be used as a dyestuff, applicable from aqueous solution, and may be applied for instance as an acid dye for wool.

The color may also be subjected to common operations for introducing nuclear substituents, such as nitration or exhaustive chlorination.

Where the oxidation treatment introduces nitro groups into the color molecule, or where additional nitro groups have been introduced by nitrating the oxidized color, these may be reduced to amino groups, and then the color may be subjected to various, per-se known, reactions applicable to amines, for instance diazotization and coupling, replacement of the hydrogen atoms of the amino groups by alkyl, aryl or acyl radicals, etc.

Likewise, where the coloring matter possess sulfonic acid groups, these may be laked, in manner per se known, for instance by the aid of barium chloride or aluminum hydroxide.

It is clear, that the coloring matters resulting from the oxidation of my novel intermediate compounds are themselves capable of serving as intermediates for a vast field of novel pigments and dyestuffs.

The color of the dimerized compounds is generally yellow to orange. Since the color possesses 4 basic N-atoms, it readily forms salts with acids, and these are generally of an intense, red color. Such salts may be formed in the step of oxidation from the dibenzimidazolyl methane stage into the ethylene form, especially where the oxidizing agent is acid, for instance in the treatment with nitric acid. In such cases, an extra step of basification, for instance by treatment with dilute sodium hydroxide, is added to the process, to convert the red salt into its free base form, which is of a tinctorially stable, yellow to orange shade.

Without limiting my invention, the following examples will illustrate my preferred mode of procedure. Parts mentioned are by weight.

Example 1.—Dibenzimidazolyl methane 1000 parts of o-phenylene diamine were suspended in 2500 parts of trichlorobenzene and heated under agitation to 170° C. 740 parts of diethyl malonate were added slowly over a period of two hours while the temperature was maintained at 180°–185° C. Water and ethyl alcohol distilled out and were collected and measured. The mixture was then heated to 200° C. and held at 200° C. until no more volatile products were formed about (1 hour); it was then cooled and filtered. The solid was washed with benzene and alcohol until free of trichlorobenzene. (Alternatively, the trichlorobenzene may be removed by steam distillation.) After drying, a light greenish product was obtained, whose analysis for carbon, hydrogen and nitrogen agreed with the figures required for di(2-benzimidazolyl)-methane. The product is soluble in acetic acid, dilute hydrochloric acid, and both concentrated and dilute sulfuric acid. It is nearly insoluble in benzene and trichlorobenzene, and only sparingly soluble in nitrobenzene and alcohol. After purification it is a light yellow, nearly white, solid.

The same end product may also be obtained if the diethyl malonate in the above example is replaced by an equivalent quantity (610 parts) of dimethyl malonate.

Example 2.—Oxidative dimerization into color 500 parts of di(2-benzimidazolyl)-methane (from Example 1) were suspended in 2000 parts of trichlorobenzene along with 200 parts of anhydrous potassium carbonate. The mixture was heated to 160° C. and 250 parts of nitrobenzene were added slowly. The mixture was then heated to 190°–195° C. and maintained at this temperature for 3 hours. After cooling, the solid was filtered off and washed with nitrobenzene. Nitrobenzene was steam distilled from the wet cake, and the residual aqueous mass was treated with aqueous 5% sodium hypochlorite at 70° C. until no more hypochlorite was consumed (in order to destroy impurities). The crude, yellow pigment was filtered off, washed with water and dried.

This product is analogous to the products of Examples 6 and 10 of my said earlier application, Serial No. 278,971, in color, solubility and light stability. Analysis for carbon, hydrogen, and nitrogen give values which correspond to those required for 1,1,2,2-tetra(2-benzimidazolyl)-ethylene. The product dissolves in concentrated sulfuric acid producing an orange colored solution, whereas the initial methane compound is nearly colorless in sulfuric acid solution.

Similar results are also obtained if the aforementioned trichlorobenzene suspension of dibenzimidazolyl-methane (without potassium carbonate) is oxidized by means of concentrated nitric acid, powdered sulfur, or a stream of air at about 200° C., in lieu of the nitrobenzene above indicated.

Example 3.—Dimerization with chlorination 20 parts of di(2-benzimidazolyl)-methane (from Example 1) were dissolved in 200 parts of acetic acid. The solution was heated to 60° C. and 114 parts of a 5.25% solution of sodium hypochlorite in water was added dropwise during 30 minutes. The temperature was held at 60°–70° C. during addition of hypochlorite, and good agitation was maintained. A bright red product resulted. After cooling the reaction mass, the product was filtered off, washed with water and then with a little dilute ammonium hydroxide. A bright yellow solid resulted. Analysis for C, H, N and Cl gave values which correspond to those calculated for 1,1,2,2-tetra(2-benzimidazolyl)-ethylene possessing 0.5 to 1 chlorine atom. When acid pasted, the product showed similar color, tinctorial strength, and light stability to the product of Example 2.

Example 4.—Direct color formation by malonate process 50 parts of o-phenylene diamine and 500 parts of nitrobenzene were heated together, with agitation, to 170° C. 42 parts of diethyl malonate were added slowly (over a period of 2 hours), while maintaining the mixture at a temperature of 180°–185° C. Water and alcohol distilled out during this process. The mixture was then heated to 200° C. and held at this temperature until no further volatile products came off (about 20 minutes). The mass was then cooled and filtered. The filter cake was washed successively with benzene and alcohol until free of nitrobenzene, and dried. The bright yellow color thus obtained was similar in properties to the products of Examples 2 and 3, and its analysis agreed with the assumption that it was 1,1,2,2-tetra(2-benzimidazolyl)-ethylene.

In similar manner, the corresponding nuclearly substituted colors may be obtained by using, in Example 1 or 4, in lieu of o-phenylene diamine itself, its 4-methyl, 4-ethyl or 4-methoxy derivative.

In lieu of trichlorobenzene in Examples 1 and 2 above, other convenient inert solvents having sufficiently high boiling points may be used, for instance: o-dichlorobenzene, naphthalene, α-chloro-naphthalene, α-methyl-naphthalene, phenol, the chlorophenols, and nitrobenzene if used in the absence of alkalis.

Numerous other variations in the details of procedure will be readily apparent to those skilled in the art.

I claim as my invention:

1. As new compounds, the dibenzimidazolyl methanes of the group consisting of di(2-benzimidazolyl)-methane and its nuclear methoxy and lower alkyl derivatives.

2. A process of preparing a coloring matter, which comprises reacting with an oxidizing agent upon a dibenzimidazolyl-methane of the group consisting of di(2-benzimidazolyl)-methane and its nuclear methoxy and lower alkyl derivatives, whereby to join two molecules of said compound at the methane carbon atoms in the form of an ethylene linkage.

3. A process as in claim 2, the dibenzimidazolyl-methane being formed in situ by reacting a lower dialkyl malonate, in a liquid medium comprising an oxidizing agent, with a compound selected from the group consisting of o-phenylene diamine and its nuclear methoxy and lower alkyl derivatives.

4. A process as in claim 3, wherein the liquid reaction mass contains nitrobenzene and an alkali metal carbonate.

5. A process as in claim 2, wherein the dibenzimidazolyl-methane is synthesized by reacting, in the absence of an oxidizing agent, diethyl malonate with a phenyl compound having two primary amino groups in ortho position to each other, followed by subjecting the dibenzimidazolyl-methane thus formed to oxidative dimerization.

6. A process as in claim 5, the dimerization being effected by the aid of nitrobenzene in the presence of an alkali-metal carbonate.

7. A process for preparing a coloring matter, which comprises reacting one mole of a lower dialkyl malonate, in a liquid medium containing nitrobenzene and an alkali-metal carbonate, with not less than 2 moles of o-phenylene diamine, and recovering the resulting tetrabenzimidazolyl ethylene compound.

8. A process for preparing a coloring matter, which comprises reacting one mole of a lower dialkyl malonate, in the absence of oxidizing agents, with not less than 2 moles of o-phenylene diamine, whereby to form dibenzimidazolyl methane, and then treating this compound with nitrobenzene and an alkali-metal carbonate, whereby to oxidize the dibenzimidazolyl methane into a tetrabenzimidazolyl ethylene compound.

References Cited in the file of this patent

UNITED STATES PATENTS

| Number | Name | Date |
|---|---|---|
| 2,271,378 | Searle | Jan. 27, 1942 |

OTHER REFERENCES

Shriner et al.: J. Am. Chem. Soc., vol. 63, August 1941, pp. 2277–8.

Phillips: J. Am. Chem. Soc., vol. 64, January 1942, p. 187.

Wright: Chem. Reviews, vol. 48, p. 409 (1951).